United States Patent
Rüdiger et al.

(10) Patent No.: US 7,919,935 B2
(45) Date of Patent: Apr. 5, 2011

(54) BRIGHTNESS SENSOR

(75) Inventors: Gerfried Rüdiger, Leipzig (DE); Jens Richter, Leipzig (DE); Oliver Narwark, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 917 days.

(21) Appl. No.: 11/793,003

(22) PCT Filed: Dec. 1, 2005

(86) PCT No.: PCT/EP2005/056378
§ 371 (c)(1),
(2), (4) Date: Jul. 30, 2007

(87) PCT Pub. No.: WO2006/063937
PCT Pub. Date: Jun. 22, 2006

(65) Prior Publication Data
US 2008/0150432 A1 Jun. 26, 2008

(30) Foreign Application Priority Data
Dec. 14, 2004 (DE) .................. 10 2004 060 199

(51) Int. Cl.
*G05F 1/00* (2006.01)
(52) U.S. Cl. ............... 315/307; 315/291; 315/169.3; 315/169.1; 315/150; 313/502; 313/506; 345/207
(58) Field of Classification Search .......... 313/509, 313/502, 505, 511, 512, 506, 498; 315/169.3, 315/169.1, 291, 307, 150, 155, 159; 345/63, 345/89, 102, 207, 690
See application file for complete search history.

(56) References Cited

U.S. PATENT DOCUMENTS
4,295,148 A 10/1981 Marine et al.
(Continued)

FOREIGN PATENT DOCUMENTS
DE 198 25 435 A1 12/1999
(Continued)

OTHER PUBLICATIONS

European Office Action dated May 31, 2010 with English translation of relevant parts.
Paul Dietz et al., "Very Low-Cost Sensing and Communication Using Bidirectional LEDs," Mitsubishi Electric Research Laboratories, Jul. 2003, pp. 1-19, XP007913121. (European OA).

*Primary Examiner* — Haissa Philogene
(74) *Attorney, Agent, or Firm* — Collard & Roe, P.C.

(57) ABSTRACT

An electroluminescent (EL) element is connected to the power supply and is intermittently operated as a lighting device and as a brightness sensor. For this purpose, the processing unit induces the controlled AC voltage source to reduce the voltage for a short period. The current intensity is measured by current measuring devices and the corresponding measuring signal is digitized using the analog/digital converter (A/D). A processing unit uses the signal and the effective voltage to determine, by means of empirical calibration data stored in the memory or by using a calibration function, the brightness, i.e. the luminance of the light that is incident on the EL element. The processing unit associates, using desired values stored in the memory, the detected brightness with an operating voltage level which ensures the desired emission brightness of the EL element when operated as a lighting device. Optionally, the determined operating voltage is corrected in order to take into consideration any brightness loss of the EL element caused by aging. The optionally corrected value is output via the control channel as the desired operating voltage and is maintained by the power supply unit until the next measuring interval.

31 Claims, 2 Drawing Sheets

U.S. PATENT DOCUMENTS

| | | | |
|---|---|---|---|
| 5,093,698 A * | 3/1992 | Egusa | 257/40 |
| 5,097,299 A | 3/1992 | Donhowe et al. | |
| 5,349,269 A | 9/1994 | Kimball | |
| 5,747,938 A | 5/1998 | Beard | |
| 5,869,930 A * | 2/1999 | Baumberg et al. | 313/506 |
| 6,452,576 B1 * | 9/2002 | Van Velzen et al. | 345/82 |
| 6,664,744 B2 | 12/2003 | Dietz | |
| 6,756,952 B1 | 6/2004 | Decaux et al. | |

FOREIGN PATENT DOCUMENTS

| | | |
|---|---|---|
| DE | 695 17 642 T2 | 2/2001 |
| DE | 699 08 309 T2 | 4/2004 |
| EP | 0 704 912 B1 | 4/1996 |
| EP | 0 838 975 A1 | 4/1998 |

* cited by examiner

BRIGHTNESS SENSOR

CROSS REFERENCE TO RELATED APPLICATIONS

Applicants claim priority under 35 U.S.C. §119 German Application No. DE 10 2004 060 199.2 filed Dec. 14, 2004. Applicants also claim priority under 35 U.S.C. §365 of PCT/DE2005/056378 filed Dec. 1, 2005. The international application under PCT article 21 (2) was not published in English.

BACKGROUND OF THE INVENTION

1. Field of the Invention

The present invention relates to brightness sensors, in particular also brightness sensors for detecting the ambient brightness for regulating electroluminescent elements.

2. Description of the Related Art

Brightness, i.e., incident radiation in the spectra range of visible light, is typically measured using photoelectric sensors. These include photoresistors, photodiodes, photoelements, vacuum photocells, or gas-filled photocells.

If the brightness is measured integrally over a larger area, the typical photoelectric sensors frequently reach limits. These are due to the small dimensions of the areas which absorb light of cited sensors.

The integral light incidence on a larger area is of interest as a measured variable, for example, if the "ambient brightness" or "room brightness" is to be determined, i.e., the illumination of a room as a whole. In contrast, if only the light incidence on a small area is detected here, the measurement result may represent the actual light conditions completely inadequately under certain circumstances. This may be illustrated using the example of a darkened room, in which light is only incident through the door gap. If a small-area brightness sensor happens to lie in the light cone of the door gap, the measurement result would incorrectly indicate a significantly greater ambient brightness than actually exists in the room, viewed integrally.

To measure the integral light incidence on a larger area and/or the mean brightness of the light incident on the area, a remedy if typical brightness sensors are used is employing multiple sensors which are distributed situated over the area, or a movable configuration of one sensor. Both measures are more complex and thus more expensive the higher the area component whose light incidence is actually to be detected. In addition, the light incidence is not actually integrally detected, but rather solely at individual partial areas and then calculated up to the entire area by extrapolation. An extrapolation error accordingly results.

SUMMARY OF THE INVENTION

In view of the set of problems described, it is the object of the present invention to provide a method and a brightness sensor for measuring the integral light incidence on an area which provides reliable measurement results in relation to the prior art and may be implemented using the least possible technical outlay.

The set of problems described also has special significance if a work environment equipped with illuminated and/or illuminable areas or also a decorative room design is to be adapted automatically to the light conditions existing there. For example, if liquid crystal displays having background illumination, large-area backlit images, visual aids, or advertising displays are used, the illumination is ideally to be made a function of the external light incidence on these areas. Typical brightness sensors may typically only be situated neighboring the cited areas, however, so as not to interfere with their appearance and/or their function. Statements about the light incidence on the illuminated and/or illuminable areas themselves are again only obtainable by extrapolation and are accordingly subject to error. Even if local interruptions in the form of measured light inlets for brightness sensors would be acceptable in the appearance of the illuminated and/or illuminable area, their proportion of the entire area would naturally be very limited.

Electroluminescent elements (in short: EL elements) have more recently been used as lights for the cited applications, using which large, uniformly illuminated areas may be implemented with extremely low installation depth.

An EL element for backlighting a video display is described in the publication U.S. Pat. No. 5,747,938, the brightness being controlled by an external light detector. The brightness sensor is also situated next to the display here, and thus does not measure the intensity of the light actually incident on the display area.

Accordingly, it is particularly also the object of the present invention to provide a method and activation electronics for regulating electroluminescent elements as a function of the ambient brightness, the light incidence on the electroluminescent element itself being detected as much as possible. In addition, the method is to be able to be implemented as cost-effectively is possible.

According to one aspect of the present invention, the object is achieved by using an electroluminescent element which has at least two electrode layers and one layer having intercalated electroluminophores as a brightness sensor. The capacitance of the electroluminescent elements or a variable dependent thereon is measured as a signal dependent on the light incidence. This may be practically implemented by measuring the current flowing as a result of an AC voltage applied to the electroluminescent element.

It is thus possible in a way completely surprising to those skilled in the art to regulate the brightness of an electroluminescent element as a function of the ambient brightness, without additional brightness sensors having to be provided. The electroluminescent element is preferably operated alternately as a lamp and as a brightness sensor for this purpose; especially preferably, the intermittent operation as a brightness sensor occurs in each case for a time span close to or below the limit of perception of the human eye, i.e., for intervals in the range from 40-60 ms or preferably less.

Regulation as a function of the ambient brightness is also understood in the scope of this application as shutdown of the operation as a lamp if the brightness falls below a fixed ambient brightness and/or starting the operation as a lamp upon exceeding a fixed ambient brightness. Greater or lesser brightness of the electroluminescent elements (i.e., light emission of higher or lower intensity) is achievable in the regulation according to the present invention by raising or lowering the operating voltage of the electroluminescent element. A possible shift of the color location of the emitted radiation because of the voltage change may be compensated for by adapting the frequency of the AC voltage. A frequency increase typically causes a shift of both the x and also the y coordinates of the color location in the CIE system toward lower values. Typical rated operating ranges of electroluminescent elements are 50-200 volts (and sometimes greater)/50 Hz up to a few kilohertz (typically 400-2000 Hz).

For intermittent operation as a brightness sensor, the above-mentioned measurement of the current flowing because of the AC voltage applied to the electroluminescent element suggests itself as a measured variable dependent on the ambient brightness. To increase the measurement precision, the voltage is reduced for this purpose, preferably to less than half, more preferably a fifth of the (rated) operating voltage during operation as a lamp. According to an especially preferred embodiment, the applied voltage (i.e., the absolute value of the voltage amplitude) for the operation as a brightness sensor is between 5 and 50 volts (effective), preferably at the lower end of the specified span.

Thus, a change of the ambient light density from 0 to 300 candela per square meter at a measurement frequency of 400 Hz may be registered in a voltage range of approximately 10-15 volts as a change of the capacitance by approximately 50%.

The cost savings by dispensing with an additional brightness sensor are considerable. Furthermore, the present invention allows the illumination brightness to be regulated as a function of the light actually incident on the lighted area. The background illumination of a liquid crystal display implemented using an electroluminescent element may thus be adapted quasi-continuously to continuously changing local light incidence, i.e., two conditions which occur in particular in mobile applications, for example, displays in the automobile field. Of course, other light elements may also thus be continuously adapted to changing light conditions.

According to a further aspect of the present invention, the object is achieved by an analysis circuit for connection to an electroluminescent element for its operation as a brightness sensor which has a measuring unit for measuring at least one of a capacitance of the electroluminescent element and the current flowing because of the applied AC voltage, a computer unit, which is equipped to calculate a brightness value dependent on at least one of the measured current and the measured capacitance, and an output interface for outputting a signal corresponding to the calculated brightness. Preferred embodiments may be implemented as discussed herein.

According to a further aspect of the present invention, the object is achieved by activation electronics for regulating the brightness of an electroluminescent element as a function of the ambient brightness, which have a voltage supply for applying a variable AC voltage to the electroluminescent element, a measuring unit for measuring at least one of the current flowing because of applied AC voltage and a capacitance of the electroluminescent element, and a regulating unit which has a signal input for receiving a measured signal from the measuring unit and a signal output for outputting a control signal to the voltage supply. The activation electronics are equipped to perform a method for regulating the brightness of an electroluminescent element operated as a lamp, which has at least two electrodes layers and a layer having intercalated electroluminophores, dependent on the ambient brightness, wherein the electroluminescent element itself is used as a sensor to measure the ambient brightness, by ascertaining at least one of the current flowing because of an AC voltage applied to the electroluminescent element and a capacitance of the electroluminescent element as a signal dependent on the ambient brightness, and wherein the brightness of the electroluminescent element is corrected by changing at least one of the voltage amplitude and the frequency.

According to a further aspect of the present invention, the object is achieved by a brightness sensor for measuring the integral light incidence on an area, which has a capacitor construction comparable to a typical electroluminescent element. The brightness sensor has two electrode layers extending over the area, of which at least one is light-transparent, a layer containing intercalated electroluminophores between the electrode layers, connection means for connecting an electronic circuit, which allows the measurement of the capacitance of the capacitor formed by the electrode layers and/or a variable dependent thereon, and an electronic circuit, which allows the measurement of at least one of the capacitance of the capacitor formed by the electrode layers and a variable dependent thereon.

At least one of the electrode layers is preferably sputtered or vapor-deposited on the substrate. A preferably transparent plastic film, for example, made of polyethylene terephthalate (PET) may advantageously be used as the substrate. An especially suitable electrode material is indium-tin oxide (ITO). Furthermore, electrode layers may advantageously comprise printing pastes having ITO or ATO (antimony-tin oxide) or transparent, organic conductive lacquers. The electrode layer, which is situated on the side of the layer containing the dispersed electroluminophores facing away from the light incidence to be measured, does not need to be implemented as transparent.

An opaque embodiment of the rear side is frequently even desirable to obtain a measured signal which is only a function of the brightness on the front side. Vice versa, the transparent embodiment of all electrodes and insulating layers on the front and rear sides offers the possibility of measuring the sum of the light incidence on both sides integrally. Opaque coverings of partial areas allow these partial areas to be subtracted from the brightness measurement, if this is desired.

The electroluminophores (luminescent pigments) are embedded in an organic or inorganic binder which is as transparent as possible, or is at least not completely opaque. Starting materials are usually doped zinc sulfides or other common inorganic luminescent pigments. In principle, all electroluminophores typical in the field of electroluminescent technology are suitable, in addition, novel luminescent pigments may also be used, of course.

An insulating layer is usually provided on the side of the brightness sensor facing away from the substrate. Providing further insulating or dielectric layers may also be expedient.

Brightness sensors according to the present invention may be produced, like typical electroluminescent elements, having almost arbitrary area dimensions at extremely low thickness, so that the light incidence on areas multiple square meters large is also integrally measurable. In addition, the thin layer construction of brightness sensors according to the present invention may be implemented as flexible depending on the design of the substrate in particular, so that, for example, cylindrical measurement areas or measurement areas curved in space in another way may be represented to measure the light incidence from various directions.

In particular in large-area embodiments it is advisable to contact the electrode layers via so-called busbars, i.e., bordering or peripheral, well conductive structures made of silver and/or copper and/or carbon paste, metal films, or the like.

As needed and depending on the desired measurement precision in brightness sensors and/or analysis circuits according to the present invention, one skilled in the art will take precautions to compensate for external interfering influences, such as temperature effects.

In some circumstances, it may be necessary to also consider aging effects of the sensor in the measured data analysis, above all if it is also operated as a lamp. In particular in the latter case, it is conceivable that the measured signal changes with increasing operating duration. A corresponding compensation may be implemented using data to be obtained empirically on the basis of a design.

The possibility advantageously also exists for the regulation of the brightness of an electroluminescent element according to the present invention of considering its age-related brightness reduction in the regulating characteristic.

The operating voltage or operating frequency is preferably not adapted solely as a function of the simple operating duration, but rather as a function of the (cumulative) electrical energy input up to this point. For this purpose, the electrical power and/or a variable related thereto is continuously detected. The integral calculated over the electrical power from the first operation up to the current instant corresponds to the cumulative electrical energy input. An age-related brightness loss is typically compensated for by a voltage increase (i.e., an increase of the voltage amplitude).

The adaptation of the operating voltage as a function of the cumulative electrical energy input offers smaller deviations from the setpoint brightness of an accordingly regulated EL element. Namely, it has been found that a specific age-related brightness loss occurs later if an EL element is frequently operated at reduced operating voltage (as is typically the case in the brightness regulation as a function of the ambient brightness according to the present invention), than with continuous operation at rated operating voltage.

An adaptation of the frequency of the AC voltage may counteract a change of the light color of the EL element with increasing age.

The adaptation of the voltage amplitude and/or frequency to be selected as a function of the cumulative electrical energy input may be stored in the form of discrete comparison values and/or on the basis of a function in mathematical analytic form. A function of this type and/or a suitable number of comparative values may be obtained empirically on the basis of a design of the EL element to be activated or also by accessing experiential or estimated values. Linear or polynomial regression suggests itself for formulating the function on the basis of correspondingly provided values, the latter allowing higher precision of the reproduction of the ascertained relationship between the cumulative energy input and the voltage regulation necessary to achieve uniform light densities.

The consideration of aging effects in a regulating procedure according to the present invention for setting a desired brightness may advantageously comprise the following steps:
  ascertaining a desired light strength by measuring the ambient brightness in sensor operation
  ascertaining a voltage base level (=the voltage level which corresponds to the desired brightness in a non-aged EL element)
  ascertaining a voltage correction factor as a function of the cumulative electrical energy input at the instant of initiating the regulating procedure to compensate for the expected age-related brightness loss
  optionally ascertaining a frequency correction factor to compensate for unexpected color location shift
  setting the voltage amplitude increased by the voltage correction factor in relation to the voltage base level
  optionally setting the frequency adapted by the frequency correction factor.

According to an advantageous further implementation, the aging is compensated for by step-by-step adaptation of the voltage amplitude and/or frequency. A new compensation step is preferably first set upon the next startup procedure of the EL element, according to which (according to a stored relationship) an adaptation of the setting parameter is predefined on the basis of reaching a corresponding cumulative electrical energy input. This also prevents correction being recognizable to the observer as an abrupt sudden change of the brightness.

In principle, any variation of the present invention described or indicated in the scope of the present application may be especially advantageous, depending on the economic and technical conditions in the specific case. If not otherwise stated to the contrary and if technically able to be implemented in principle, individual features of the embodiment described are exchangeable or combinable with one another.

BRIEF DESCRIPTION OF THE DRAWINGS

Examples of preferred embodiment of the present invention will be explained in greater detail on the basis of the associated drawing. The drawings are to be seen as purely schematic.

FIG. 1 shows the layer construction of the measuring capacitor of a brightness sensor according to the present invention. The associated electronic circuit, which allows the measurement of the capacitance (or a variable dependent thereon) of the measuring capacitor, is not shown. The measured capacitance is a measure of the brightness of the incident light on the measuring capacitor (from above in the drawing).

DETAILED DESCRIPTION OF THE PREFERRED EMBODIMENTS

Figure 1:
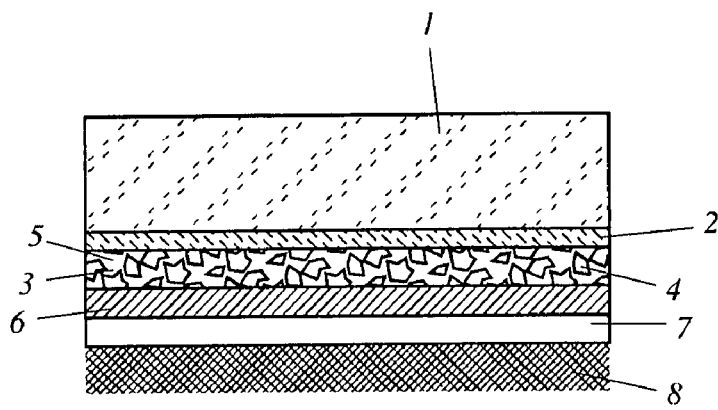
FIG. 1 shows the measuring capacitor of a brightness sensor according to the present invention in a sectional illustration (not to scale), in particular, layer thicknesses are greatly enlarged for reasons of visibility. The area of the electrode terminals is not shown.

The measuring capacitor has a transparent plastic film substrate 1, onto which a transparent ITO electrode layer 2 is sputtered on in vacuum technology. The materials suitable for the plastic film substrate 1 are manifold depending on the application, such as polycarbonate (PC), polyalkylene terephthalates, polyamide (PA), polyacrylate, polymethacrylate, polymethyl methacrylate (PMMA), polyurethane (PUR), polyoxymethylene (POM), polyethylene (PE), polypropylene (PP), polystyrene (PS), polyvinyl chloride (PVC), polyimide (PI), polyether imides (PEI), polyether, polyether ketones (PEK), polyvinyl fluoride (PVF), polyvinylidene fluoride (PVdF), or similar films which have high transparency in the optically visible wavelength range. Films made of polyethylene terephthalate (PET) are especially suitable.

A layer 3 having finely particulate, dispersed electroluminophores 4 is situated on the electrode layer 2, this layer being a transparent matrix 5 in which the electroluminophores 4 are intercalated. The layer 3 may be implemented as a cast or extruded film, but also as a screenprinted layer or the like. The illustration of the electroluminophores 4 in particular is to be viewed as purely schematic. In practice, the particles are to approximate a spherical shape as much as possible. Electroluminophores are typically sensitive to the effect of moisture. Additional layers may be integrated around them, which assume a function of a moisture barrier or vapor barrier. These layers may be largely dispensed with, however, if microencapsulated electroluminophores 4 are used. The microencapsulation is typically oxidic or nitridic, however, an organic microencapsulation or a diamond-like carbon encapsulation ("diamond-like carbon") is also conceivable.

The rear electrode layer 6, which is insulated on its side facing away from the layer 3 using the insulating layer 7, is situated on the layer 3 or on an insulating intermediate layer (not shown) located thereon.

The rear electrode layer may be produced, for example, by a doctor blade, roll coating, curtain casting, spraying, or by printing (usually using screen printing) in the form of an intrinsically conductive polymer layer and/or silver or carbon conductive pastes and/or a layer having metal oxides, such as indium-tin oxides (ITO) or antimony-tin oxides (ATO).

The insulating layer 7 may be a thin lacquer layer or the like, in addition to which or instead of which, however, an insulating plastic film may also be limited on.

The measuring capacitor shown has a self-adhesive coating 8 on its side facing away from the light incidence to be measured, using which it may be attached easily to greatly varying surfaces.

Connection means for connection to the associated electronic circuit are not shown. However, these may be designed like the terminals of typical thick-layer electroluminescent elements to their voltage supply, i.e., for example, using so-called busbars, i.e., more conductive wiring elements, which may be produced, for example, using screen printing by employing silver conductive pastes and/or copper conductive pastes and/or carbon conductive pastes or the like.

Figure 3:
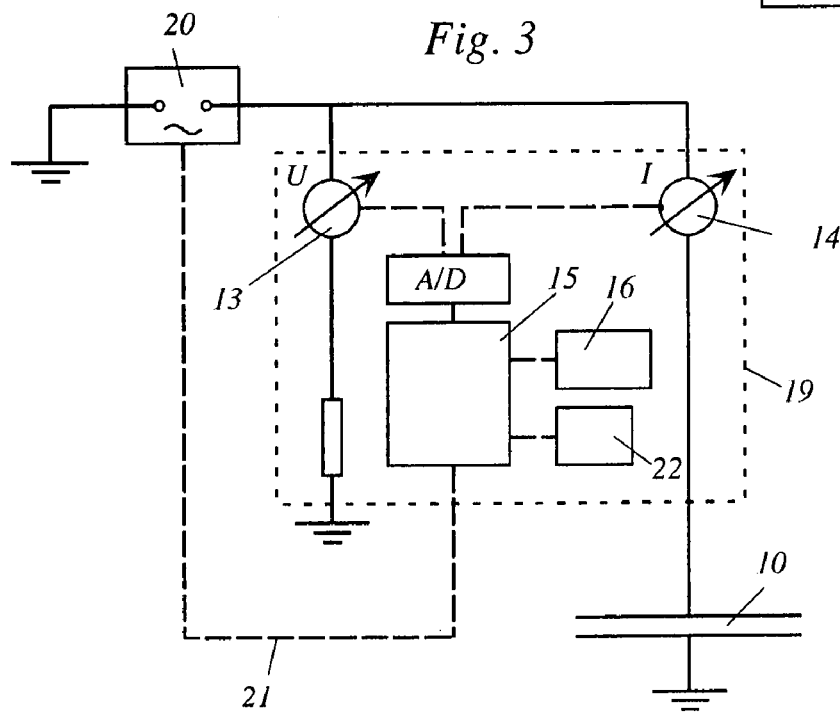
FIG. 3 shows a simplified block diagram of an EL element having activation electronics according to the present invention.

By applying an AC voltage, typically in the lower three-figure voltage range, the measuring capacitor may also be used like a typical EL element as a lamp and therefore together with activation electronics according to the present invention (for example, as shown in FIG. 3).

Figure 2:
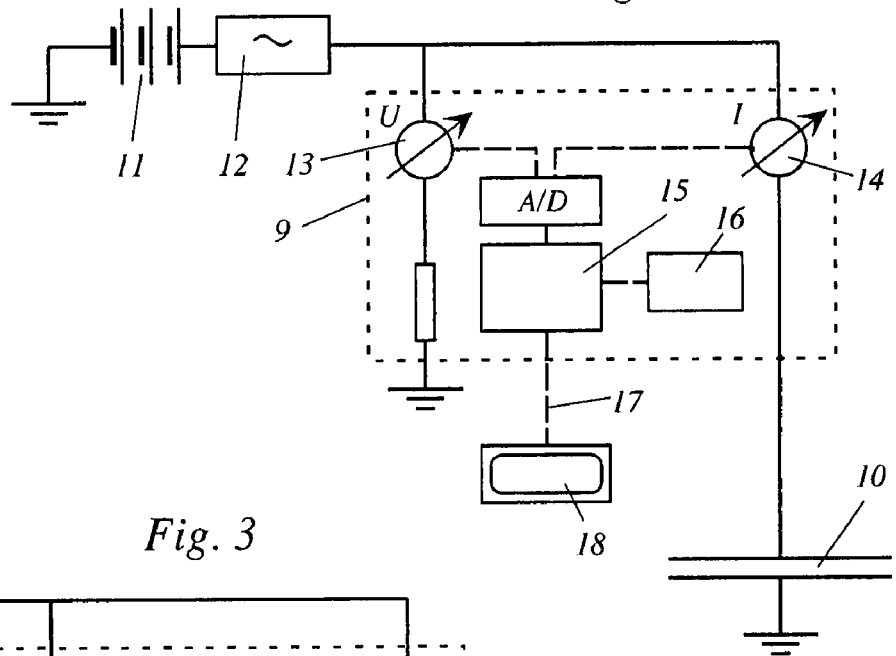
FIG. 2 shows a simplified block diagram of a measuring capacitor having at analysis circuit according to the present invention.

FIG. 2 shows an analysis circuit 9 according to the present invention for operating an EL element 10 as a brightness sensor. The EL element 10 may advantageously be constructed like the measuring capacitor described in FIG. 1. It is supplied with an AC voltage of 10 volts (effective), for example, which is provided in the example shown by an inverter 12 powered using a battery 11. Alternatively, of course, the use of a power supply unit is also conceivable.

The analysis circuit 9 has voltage measuring means 13 and current measuring means 14 for measuring the voltage and the current, respectively. The measured signals are digitized using an analog/digital converter (A/D). A processing unit 15 determines a brightness, i.e., the light density of the incident light on the EL element, from the signals using empirically ascertained calibration data stored in the memory 16. The brightness may also be calculated using a mathematical analytically formulated function possibly containing one or more calibration parameters.

An example of a set of calibration data is listed in the following table.

TABLE

| Voltage (eff.) [V] | Frequency [Hz] | Current strength [mA] | Light density [cd/m$^2$] |
|---|---|---|---|
| 10 | 400 | 64.40 | 260.00 |
| 10 | 400 | 63.60 | 200.00 |
| 10 | 400 | 61.50 | 140.00 |
| 10 | 400 | 60.00 | 107.00 |
| 10 | 400 | 58.50 | 82.00 |
| 10 | 400 | 56.40 | 65.00 |
| 10 | 400 | 55.13 | 55.00 |
| 10 | 400 | 53.87 | 45.00 |

TABLE-continued

| Voltage (eff.) [V] | Frequency [Hz] | Current strength [mA] | Light density [cd/m$^2$] |
|---|---|---|---|
| 10 | 400 | 52.52 | 37.00 |
| 10 | 400 | 50.77 | 26.00 |
| 10 | 400 | 48.70 | 17.00 |
| 10 | 400 | 46.89 | 11.00 |
| 10 | 400 | 45.10 | 6.00 |
| 10 | 400 | 44.55 | 3.00 |
| 10 | 400 | 44.08 | 0.3 |

The ascertained brightness value is output via an output channel 17 and an electronic display 18.

The activation electronics 19 illustrated in FIG. 3 are constructed similarly to the analysis circuit 9. Components corresponding to one another are therefore provided with the same reference numerals.

AC voltage is supplied via a controllable AC voltage source 20, but may also be implemented as in FIG. 2. An EL element 10 is connected to the voltage supply, which is intermittently operated as a lamp and as a brightness sensor. For this purpose, via a control channel 21, the processing unit 15 causes the controllable AC voltage source 20 to reduce the voltage to the measuring voltage of, for example, 10 volts for a short time, for example, once per second for measuring interval of 40 ms. A timer 22 is provided for this purpose.

The current strength is measured from the current measuring means 14 and the corresponding measurement signal is digitized using the analog/digital converter (A/D). A processing unit 15 determines a brightness, i.e., the light density of the incident light on the EL element, from the signal and from the effective voltage using empirically ascertained calibration data stored in the memory 16. The brightness may also be calculated using a mathematical analytically formulated function possibly containing one or more calibration parameters.

The voltage value needed for the brightness ascertainment may either be measured using corresponding voltage measuring means 13, or, if an appropriately stabilized and precisely controllable power supply unit 20 is used, the voltage value predefined via the control channel 21 is used.

Figure 4A:
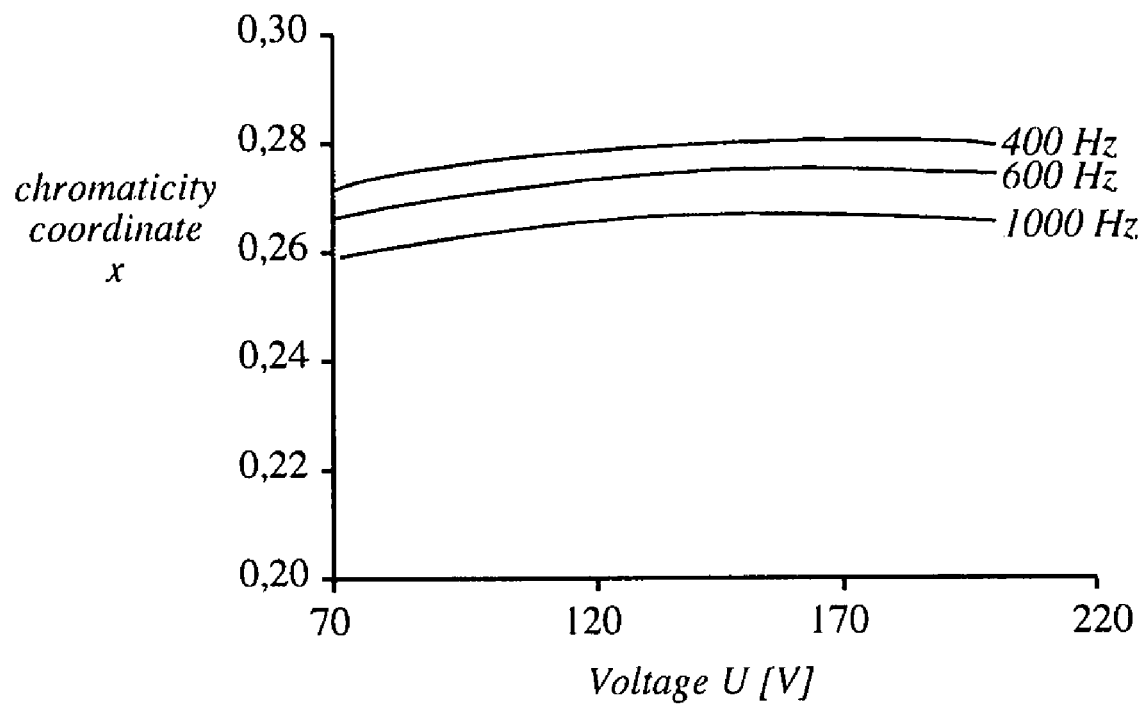
FIG. 4a shows the x coordinate of the color location (in the CIE system) of the radiation emitted by an EL element as a function of operating voltage and operating frequency.
Figure 4B:
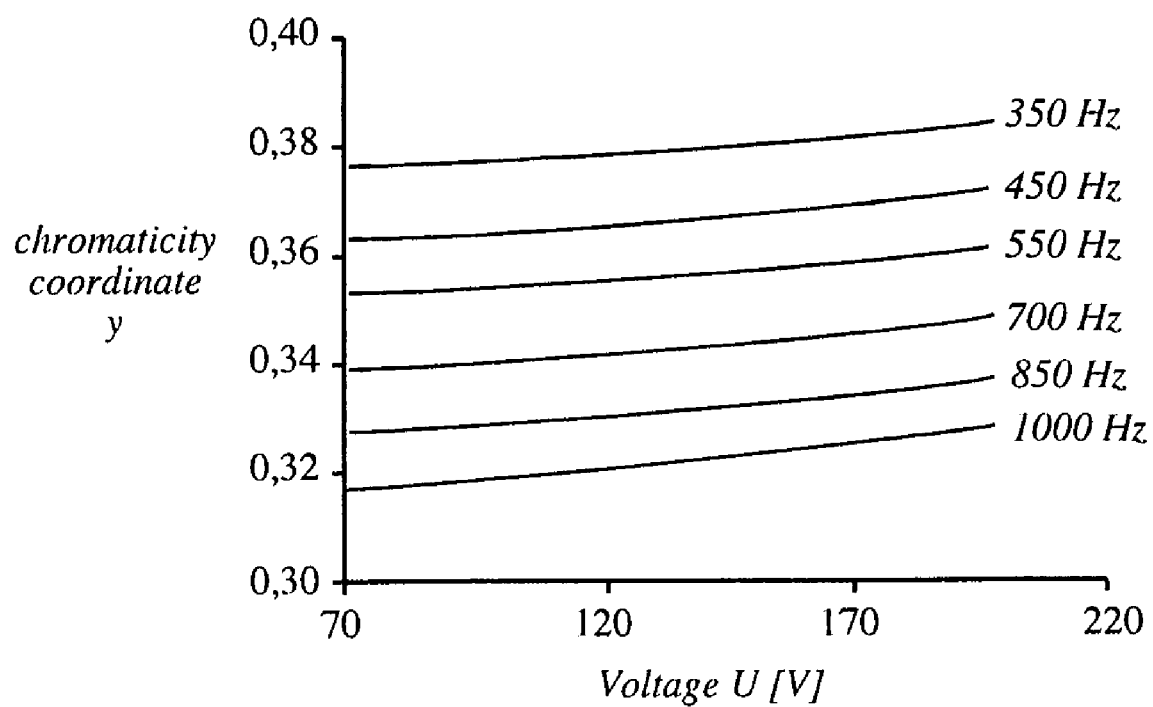
FIG. 4b shows the y coordinate of the color location (in the CIE system) of the radiation emitted by an EL element as a function of operating voltage and operating frequency.

The processing unit 15 assigns the ascertained brightness to an operating voltage level using setpoint values stored in the memory 16, which ensures the desired emission brightness of the EL element 10 in lamp operation. Optionally, the operating voltage thus ascertained is also corrected to consider an age-related brightness reduction of the EL element 10. For this purpose, the operating duration or the electrical energy input (calculated using voltage and current strength) is cumulatively detected. The possibly corrected value is output as the setpoint operating voltage via the control channel 21 and maintained by the power control unit 20 until the next measurement interval. Furthermore, an adapted AC voltage frequency may optionally also be predefined for the power supply unit 20 via the control channel 21, to achieve a possible correction of the color location of the radiation emitted by the EL element 10. The relationship between color location, operating voltage, and operating frequency which such a correction is based on is reproduced for exemplary purposes in FIGS. 4*a-b*.

As may be inferred from the above statements, the voltage (amplitude) change between different voltages or voltage amplitudes in lamp and sensor operation is not primarily understood as AC voltage operation, but rather applying an AC voltage both in lamp and also in sensor operation, whose frequency in each case significantly exceeds the changeover frequency between lamp and sensor operation.

The invention claimed is:

1. An electroluminescent element having at least two electrode layers and a layer having intercalated electroluminophores, the electroluminescent element being operated as a brightness sensor and as a lamp,
wherein the operation as the brightness sensor is performed intermittently with the operation as the lamp, and
wherein the electroluminescent element operates as the brightness sensor by measuring, as a signal dependent on the light incidence, at least one of a current flowing because of an AC voltage applied to the electroluminescent element and a capacitance of the electroluminescent element.

2. The electroluminescent element according to claim 1, wherein the intermittent operation as the brightness sensor occurs in each case for a time span of 40 ms or less.

3. The electroluminescent element according to claim 1, wherein the operation of the electroluminescent element as the brightness sensor is used for regulating the brightness of the electroluminescent element as the lamp so that a brightness of the lamp is dependent on the ambient brightness.

4. The electroluminescent element according to claim 3, wherein the regulation characteristic comprises at least one of
shutdown of the operation as the lamp upon exceeding a fixed ambient brightness and
beginning operation as the lamp if the brightness falls below a fixed ambient brightness.

5. The electroluminescent element according to claim 4, wherein the regulating characteristic is restricted to at least one of
shutdown of the operation as the lamp upon exceeding a fixed ambient brightness and
beginning operation as the lamp if the brightness falls below a fixed ambient brightness.

6. The electroluminescent element according to claim 1, wherein the intermittent operation as the brightness sensor is performed in each case for a time span not longer than close to the limit of perception of the human eye.

7. A brightness sensor for measuring an integral light incidence on an area, having
two electrode layers extending over the area, of which at least one is light-transparent,
a layer containing intercalated electroluminophores between the electrode layers,
connection means for connecting an electronic circuit, which allows at least one of the measurement of a capacitance of a capacitor formed by the electrode layers and a variable dependent thereon, and
the electronic circuit, which allows the measurement of at least one of the capacitance of the capacitor formed by the electrode layers and a variable dependent thereon.

8. An electroluminescent element having at least two electrode layers and a layer-having intercalated electroluminophores,
wherein the electroluminescent element operates as a brightness sensor by measuring, as a signal dependent on the light incidence, at least one of a current flowing because of an AC voltage applied to the electroluminescent element and a capacitance of the electroluminescent element, and
wherein the applied voltage for operation as the brightness sensor is between 1 and 50 volts (absolute value of the voltage amplitude).

9. An electroluminescent element having at least two electrode layers and a layer-having intercalated electroluminophores as a brightness sensor, the
electroluminescent element being operated as a brightness sensor and as a lamp,
wherein the electroluminescent element operates as the brightness sensor by measuring, as a signal dependent on the light incidence, at least one of a current flowing because of an AC voltage applied to the electroluminescent element and a capacitance of the electroluminescent element, and
wherein a lower electrical voltage is applied to the electroluminescent element for operation as the brightness sensor than for operation as the lamp.

10. The electroluminescent element according to Claim 9, wherein the applied voltage for operation as the brightness sensor is less than half of the maximum applied voltage for operation as the lamp.

11. The electroluminescent element according to claim 10, wherein the applied voltage for operation as the brightness sensor is less than a fifth of the maximum applied voltage for operation as the lamp.

12. A method for regulating the brightness of an electroluminescent element operated as a lamp, which has at least two electrodes layers and a layer having intercalated electroluminophores, dependent on the ambient brightness,
wherein the electroluminescent element itself is used as a sensor to measure the ambient brightness,
by ascertaining at least one of the current flowing because of an AC voltage applied to the electroluminescent element and a capacitance of the electroluminescent element as a signal dependent on the ambient brightness.

13. The method according to claim 12, wherein the brightness of the electroluminescent element is corrected by changing at least one of the voltage amplitude and the frequency.

14. The method according to claim 12, wherein the regulation characteristic comprises at least one of
shutdown of operation as a lamp upon exceeding a fixed ambient brightness and
beginning operation as a lamp if the brightness falls below a fixed ambient brightness.

15. The method according to claim 14, wherein the regulation characteristic is restricted to at least one of
shutdown of the operation as a lamp upon exceeding a fixed ambient brightness and
beginning operation as a lamp if the brightness falls below a fixed ambient brightness.

16. The method according to claim 12, wherein operation as a brightness sensor occurs intermittently to operation as a lamp.

17. The method according to claim 16, wherein the intermittent operation as a brightness sensor occurs in each case for a time span not longer than close to the limit of perception of the human eye.

18. The method according to claim 17, wherein the intermittent operation as a brightness sensor occurs in each case for a time span of 40 ms or less.

19. The method according to claim 12, wherein a lower electrical voltage is applied to the electroluminescent element for operation as a brightness sensor than for operation as a lamp.

20. The method according to claim 19, wherein the applied voltage for operation as a brightness sensor is less than half of the maximum voltage applied for operation as a lamp.

21. The method according to claim 20, wherein the applied voltage for operation as a brightness sensor is less than a fifth of the maximum applied voltage for operation as a lamp.

22. The method according to claim 12, wherein the applied voltage for operation as a brightness sensor is between 1 and 50 volts (absolute value of the voltage amplitude).

23. Activation electronics for regulating the brightness of an electroluminescent element as a function of the ambient brightness, the activation electronics comprising:
- a voltage supply for applying a variable AC voltage to the electroluminescent element,
- a measuring unit for measuring at least one of the current flowing because of the applied AC voltage and a capacitance of the electroluminescent element,
- a regulating unit which has a signal input for receiving a measured signal from the measuring unit, and
- a signal output for outputting a control signal to the voltage supply, and which is equipped to perform a method according to claim 13.

24. The method according to claim 13, wherein an age-related expected brightness reduction of the electroluminescent element is at least partially compensated for by adapting at least one of the voltage amplitude and the frequency.

25. The method according to claim 24, wherein the adaptation of at least one of the voltage amplitude and the frequency is performed dependent on at least one of the operating hour count and the cumulative electrical energy input.

26. The method according to claim 25, wherein the dependence on at least one of the operating hour count and the cumulative electrical input is taken into consideration on the basis of at least one of stored discrete comparative values and a stored function.

27. The method according to claim 24, wherein the adaptation of at least one of the voltage amplitude and the frequency for at least partial compensation of the age-related expected brightness reduction is performed in steps.

28. The method according to claim 27, wherein the increase to a new step of at least one of the voltage amplitude and the frequency is performed in each case only upon the next following startup of the electroluminescent element.

29. An analysis circuit for connection to an electroluminescent element for its operation as a brightness sensor, the analysis circuit comprising:
- a measuring unit for measuring at least one of a capacitance of the electroluminescent element and a current flowing because of an applied AC voltage,
- a computer unit, which is equipped to calculate a brightness value dependent on at least one of the measured current and the measured capacitance, and
- an output interface for outputting a signal corresponding to the calculated brightness.

30. The analysis circuit according to claim 29, having a voltage supply for applying an AC voltage to the electroluminescent element.

31. The analysis circuit according to claim 30, wherein the voltage supply is designed for at least a voltage amplitude whose absolute value is between 1 and 50 volts.

* * * * *